June 19, 1962 J. E. DOANE ETAL 3,039,517
LABELING MACHINES
Filed Aug. 19, 1959 8 Sheets-Sheet 1
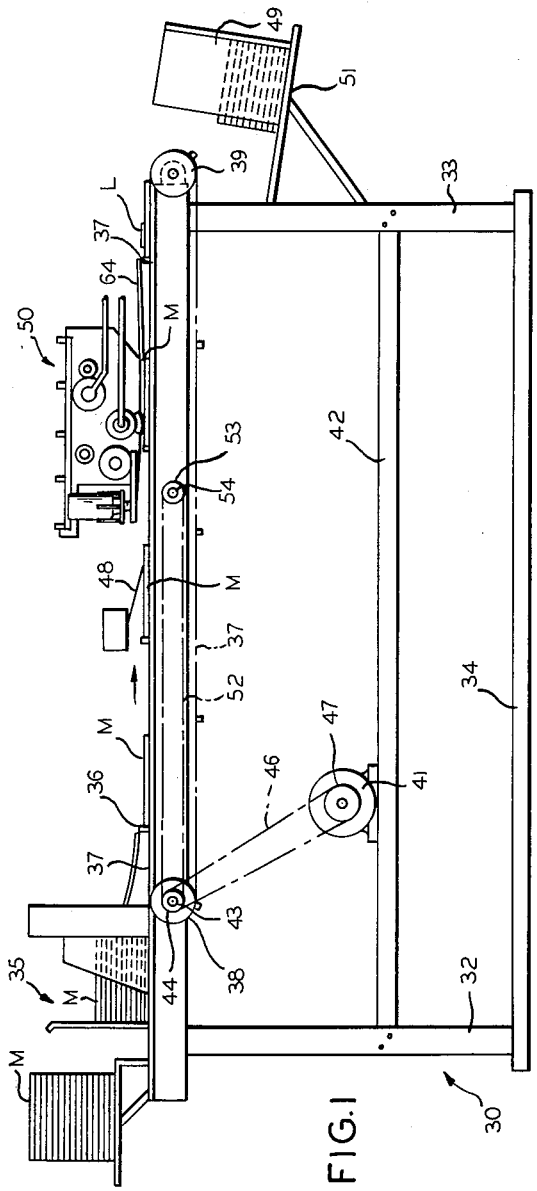
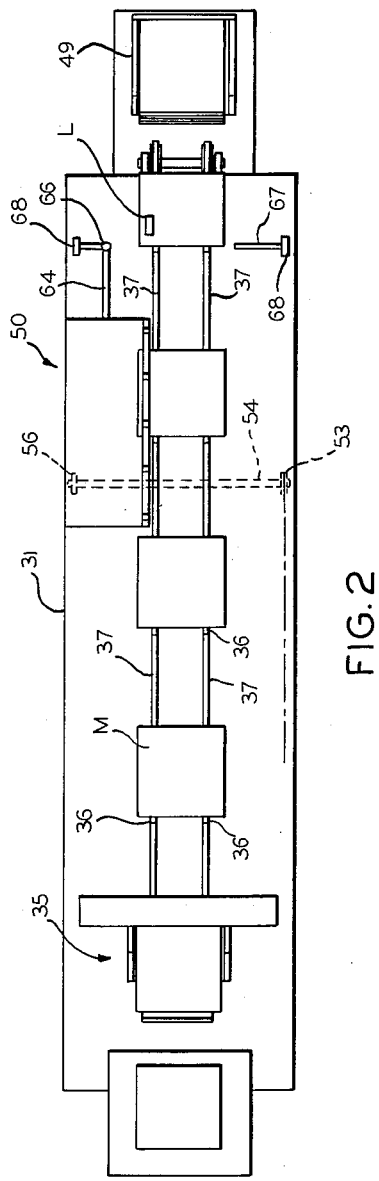
INVENTORS
JAMES E. DOANE
WAYNE F. RIDENOUR
BY
ATTORNEY June 19, 1962

J. E. DOANE ETAL 3,039,517

LABELING MACHINES

Filed Aug. 19, 1959

*INVENTORS*
JAMES E. DOANE
WAYNE F. RIDENOUR
BY

ATTORNEY

INVENTORS
JAMES E. DOANE
WAYNE F. RIDENOUR
ATTORNEY

INVENTORS
JAMES E. DOANE
WAYNE F. RIDENOUR
BY
ATTORNEY

INVENTORS
JAMES E. DOANE
WAYNE F. RIDENOUR
BY
ATTORNEY

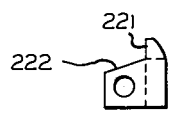
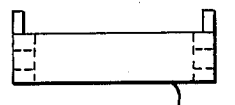
FIG.14　　FIG.15
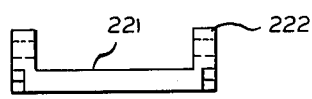
FIG.17　　FIG.16
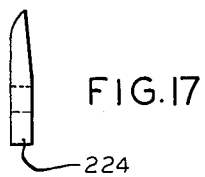
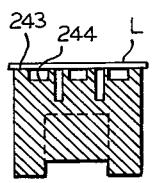
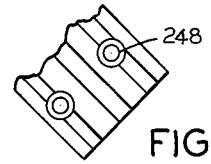
FIG.18　FIG.22　FIG.21
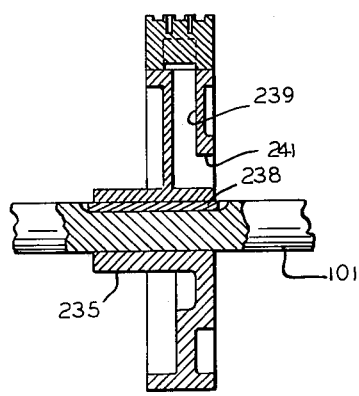
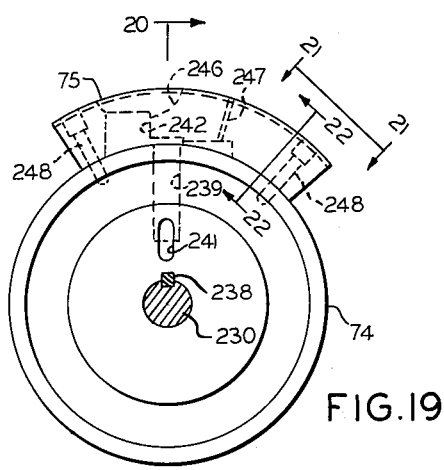
FIG.20　　FIG.19

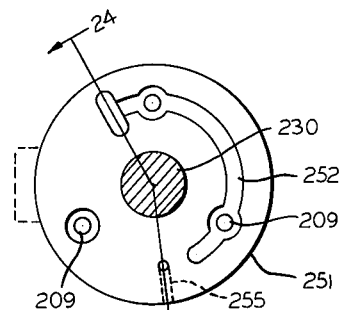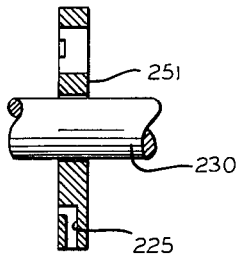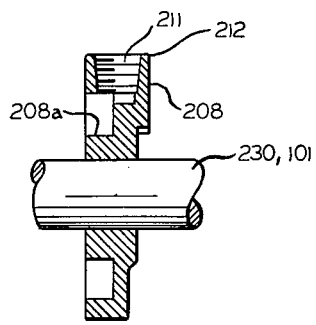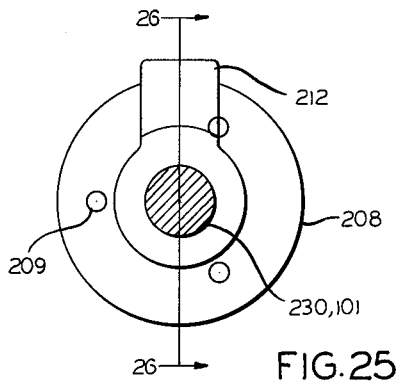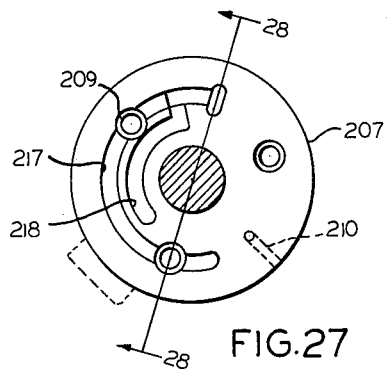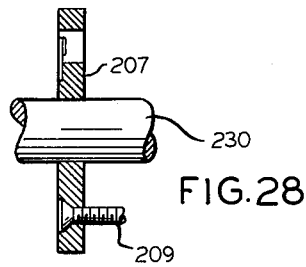

United States Patent Office 3,039,517
Patented June 19, 1962

3,039,517
LABELING MACHINES
James E. Doane and Wayne F. Ridenour, Chicago, Ill., assignors to Cheshire, Incorporated, Chicago, Ill., a corporation of Illinois
Filed Aug. 19, 1959, Ser. No. 834,739
6 Claims. (Cl. 156—511)

This invention relates generally to machines for placing an address label upon magazines, newspapers, or the like, and has particular reference to an improved machine capable of applying individual address labels from a strip where the addresses are arranged on such strip in a plurality of columns.

In Ridenour Patent No. 2,606,681, Machine for Applying Address Labels, issued August 12, 1952, there is shown a machine for applying individual severed and glued labels to a moving article such as a periodical or the like, the individual label being severed from a strip thereof. The invention herein is an improvement over the apparatus shown in said Ridenour patent in that the addresses are printed on a sheet and are arranged in a plurality of columns, the machine being capable of intermittently feeding the sheet and severing the same transversely thereof into a strip, moving the so severed strip by a strip storage roller past a rotating knife to sever the strip into a discrete address, transferring the individual severed address to an address applying roller and moving it past a flue roller, and then applying the so severed and glued individual address to a moving mailing piece.

The sheet having the addresses arranged in columns thereon presents a number of advantages over heretofore known single column address strips in that a large number of addresses can be arranged on a single sheet of a relatively small length, and in some cases it is possible to have a single sheet with all of the subscribers names arranged thereon.

With the increased use of magnetic tape and punched cards for storing subscribers data the only limitation in printing such data has been in the printing and typewriting machine, but these can make as many as ninety or a hundred characters in a single line. The time for indexing from a subscribers name line to the address and town lines can be common to as many as five subscribers if the names are arranged in columns, and it is therefore possible to sense data respecting a multiplicity of subscribers at a time, and print these in sequence from left to right on the sheet.

The preparation of addresses from such data enables the addresses to be in proper sequence for street addresses, zone numbers, and any group can conveniently be separated by town markers at the end or beginning of any sequence.

It is desirable then, to have as wide a sheet as possible with the addresses arranged in columns, and in severing such a sheet transversely the addresses will read from one end to another in proper sequence.

With the foregoing considerations in mind, it is a principal object of this invention to provide an improved address applying machine characterized by the employment of an address sheet where the individual addresses are arranged in columns thereon, the sheet being capable of being severed transversely thereof into a narrow address strip, and the so transversely severed address strip being severed into discrete individual addresses and thereafter transferred to individual periodicals or the like.

Another object is to provide a machine for applying an individual address to a moving mailing piece, each individual address having been part of a sheet with the addresses arranged in a plurality of columns thereon, the multi-columnar sheet being advanced in intermittent fashion and being severed transversely thereof into a narrow width address strip, the address strip being subsequently severed transversely thereof into individual addresses, each being capable of being applied to a moving periodical.

Other objects and important features of the invention will be apparent from the specification following taken with the drawings, which together describe and illustrate a preferred embodiment of the invention and what is now considered to be the best mode of practicing the principles thereof. Other embodiments of the invention may be suggested to those having the benefits of the teachings herein and such other embodiments are intended to be reserved especially as they fall within the scope of the appended claims.

In the drawings, which illustrate a preferred form of the invention:

FIG. 1 is a front elevational view of an address applying machine having the improvements according to the present invention embodied therein;

FIG. 2 is a plan view thereof;

FIG. 3 is a detailed elevational view of an address applying head adapted to be used with the machine seen in FIGS. 1 and 2;

FIG. 24 is a side elevational view of an address severing knife adapted to be supported by the storage roller seen in FIGS. 9, 12 and 13;

FIG. 15 is an elevational view thereof;

FIG. 16 is a top view thereof;

FIG. 17 is a side view of a rotary knife adapted to cooperate with the knife seen in FIGS. 14, 15 and 16;

FIG. 18 is an elevational view thereof;

FIG. 19 is a view taken substantially along the line 19—19 of FIG. 4, looking in the direction of the arrows, showing details of an address applying roller adapted to apply a pasted and severed address to a moving periodical;

FIG. 20 is a section taken along the line 20—20 of FIG. 19 looking in the direction of the arrows;

FIG. 21 is a detailed plan view looking in the direction of the arrows 21—21 of FIG. 19;

FIG. 22 is a section taken along the line 22—22 of FIG. 19 looking in the direction of the arrows;

FIG. 23 is an elevational view of a vacuum valve adapted to cooperate with the address applying roller seen in FIGS. 19 to 22 inclusive, said view looking in the direction of the arrows 23—23 of FIG. 4;

FIG. 24 is a section taken along the line 24—24 of FIG. 23 looking in the direction of the arrows;

Figure 4:
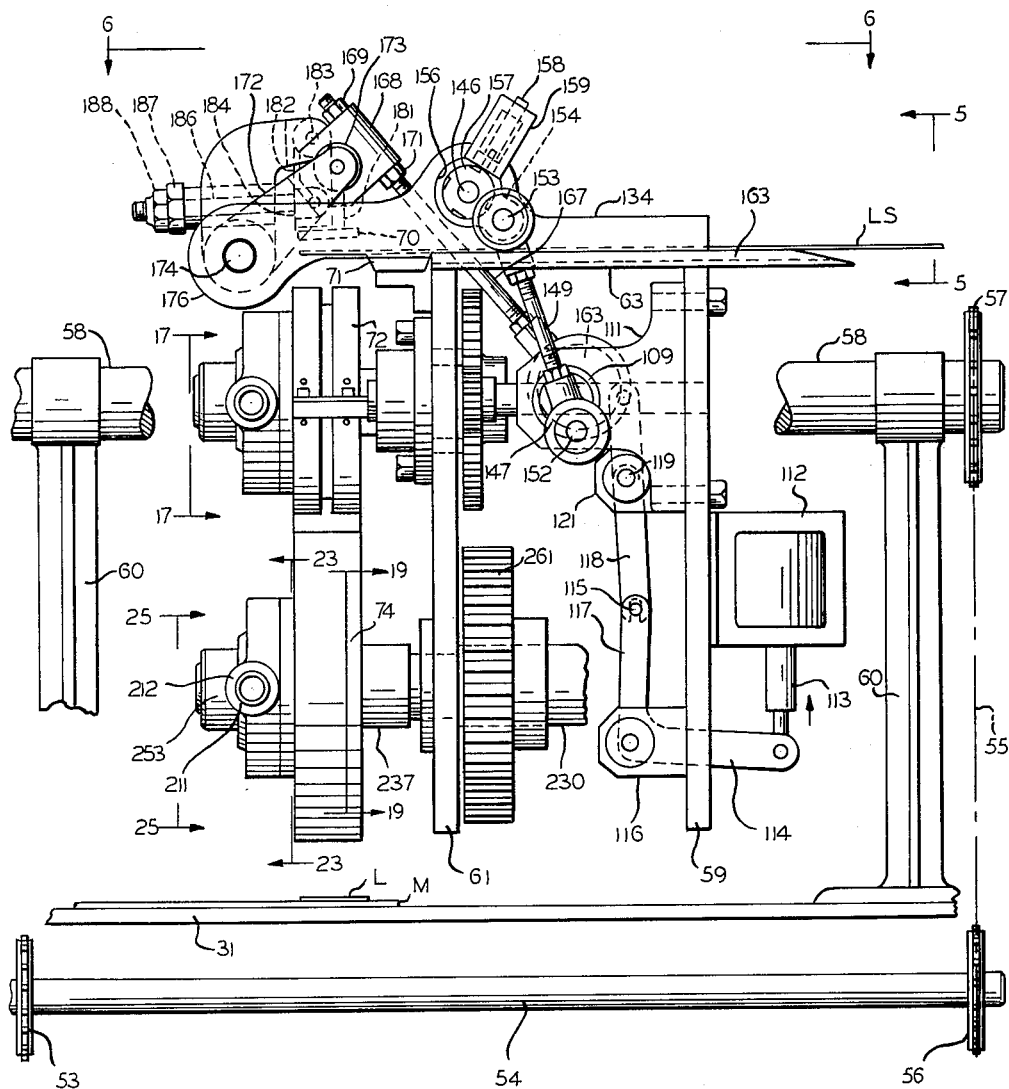
FIG. 4 is an elevational view looking in the direction of the arrows 4—4 of FIG. 3, showing details of a mechanism for advancing a sheet of addresses having the addresses arranged in columns thereon.
Figure 29:
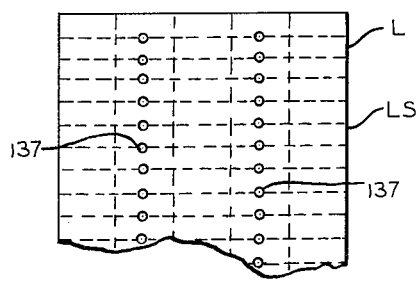
Figure 9:
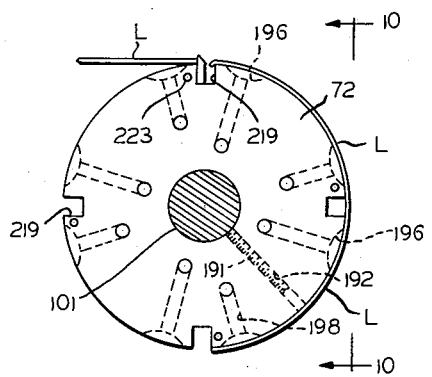
FIG. 9 is a view looking in the direction of the arrows 9—9 of FIG. 7, showing details of an address roller adapted to receive a discrete width address strip which has been formed by transversely severing a sheet of addresses having addresses arranged thereon in columns.
Figure 10:
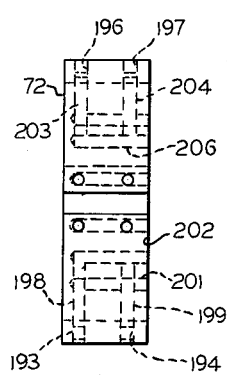
FIG. 10 is an end elevational view of the storage roller looking in the direction of the arrows 10—10 of FIG. 9.
Figure 11:
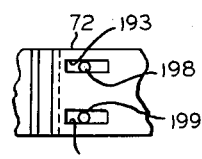
FIG. 11 is a detailed view of a portion of the periphery of the storage roller seen in FIG. 9, showing details of vacuum openings for holding the discrete width address strip to the periphery of the roller.
Figure 12:
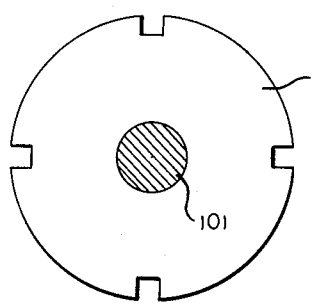
FIG. 12 is a side elevational view of the storage roller adapted for use with an address strip having the addresses arranged in four columns thereon.
Figure 13:
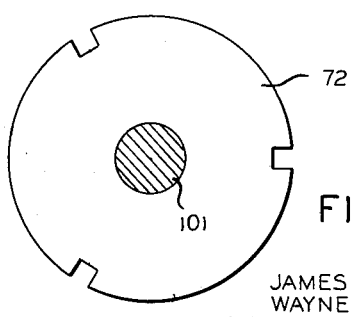
FIG. 13 is a view similar to FIG. 12 showing the configuration of the storage roller for an address strip having the addresses arranged in three columns thereon.

FIG. 25 is an elevational view looking in the direction of the arrows 25—25 of FIG. 4, showing details of a vacuum manifold adapted to cooperate with the address applying roller seen in FIGS. 19 and 20 and the vacuum valve seen in FIGS. 23 and 24;

FIG. 26 is a section taken along the line 26—26 of FIG. 25 looking in the direction of the arrows;

FIG. 27 is an elevational view looking in the direction of the arrows 27—27 seen in FIG. 4, showing details of a vacuum valve cooperating with the storage roller of FIGS. 9, 12 and 13;

FIG. 28 is a section taken along the line 28—28 of FIG. 27 looking in the direction of the arrows; and FIG. 29 is a plan view of one type of address sheet especially adapted for use with the address applying machine according to the present invention, said sheet having the addresses arranged thereon in five columns.

Referring now particularly to FIGS. 1 and 2 of the drawings, the improved addressing machine according to the present invention is referred to generally by the reference numeral 30, and includes a conveyor table 31 supported at its ends by legs 32 and 33, the bottom ends of the legs being joined by a base 34. A feed mechanism indicated generally by reference numeral 35 is supported on the conveyor table 31 at one end thereof, and is adapted to feed magazines or other flat periodicals M in the direction indicated by the arrow, each magazine M fed by the feed mechanism 35 being adapted to be engaged by lugs 36 of laterally spaced endless conveyor belts 37 which are reeved between a driving pulley 38 and an idler pulley 39.

Power for driving the endless conveyor belts 37 includes a drive motor 41 mounted upon a platform 42 extending between the supporting legs 32 and 33. Driving pulley 38 is fast upon a shaft 43 having a driving sprocket 44 fast thereon, driving sprocket 44 being driven by a sprocket chain 46 driven by a driving sprocket 47 of the drive motor 41.

The details of the feed mechanism 35 are illustrated in detail with reference to the aforesaid Ridenour patent, and so need not be described in detail herein. The magazines M engaged by the lugs 36 of the conveyor belts 37 are moved at regularly spaced intervals, each magazine M moving past a sensing switch 48 controlling the operation of the addressing head constituting part of the improvements of the present invention and referred to generally by the reference numeral 50.

The addressing head 50 is arranged to place an individual address label L upon each magazine M as it moves past the addressing head 50, and the addressed articles are discharged by the conveyor belts 37 into a receiving hopper 49 mounted on a bracket 51 secured to the end legs 33.

The addressing head 50 is driven in timed relationship to the mailing pieces M by means of a sprocket chain 52 driven by a sprocket (not shown) fast on the shaft 43, and the sprocket chain 52 drives a sprocket 53 fast upon a shaft 54 disposed beneath the table 31 and beneath the labeling head 50, see also FIG. 4.

Figure 7:
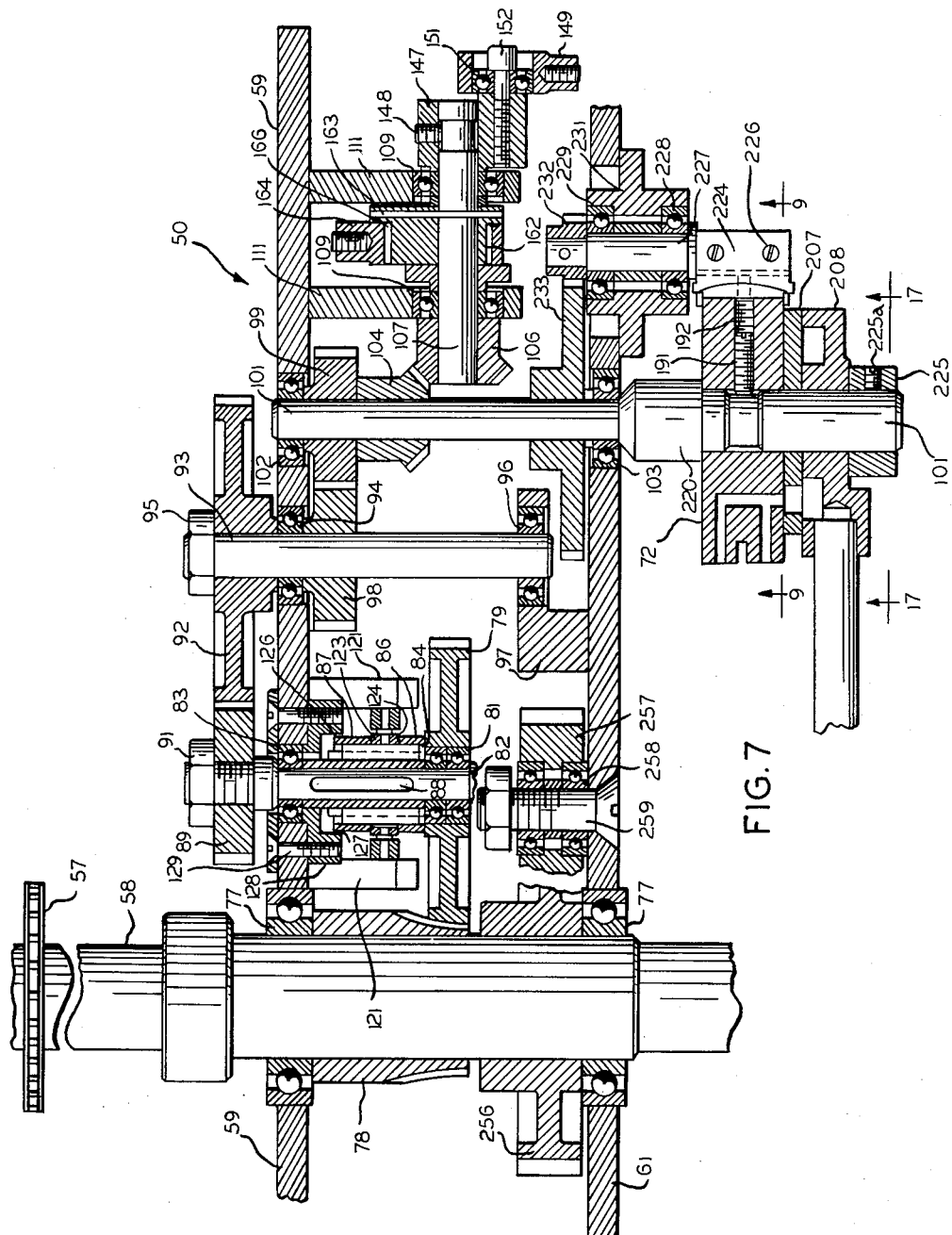
FIG. 7 is a sectional view looking in the direction of the arrows 7—7 of FIG. 3, certain parts being shown in plan view.

The shaft 54 has a sprocket 56 fast thereon which cooperates with a sprocket chain 55 driving a sprocket 57, see FIGS. 4 and 7, fast on a main drive shaft 58 for the addressing head 50. The shaft 58 is supported at each end thereof in standards 60 secured to each side of the table 31, see particularly FIG. 4.

Figure 8:
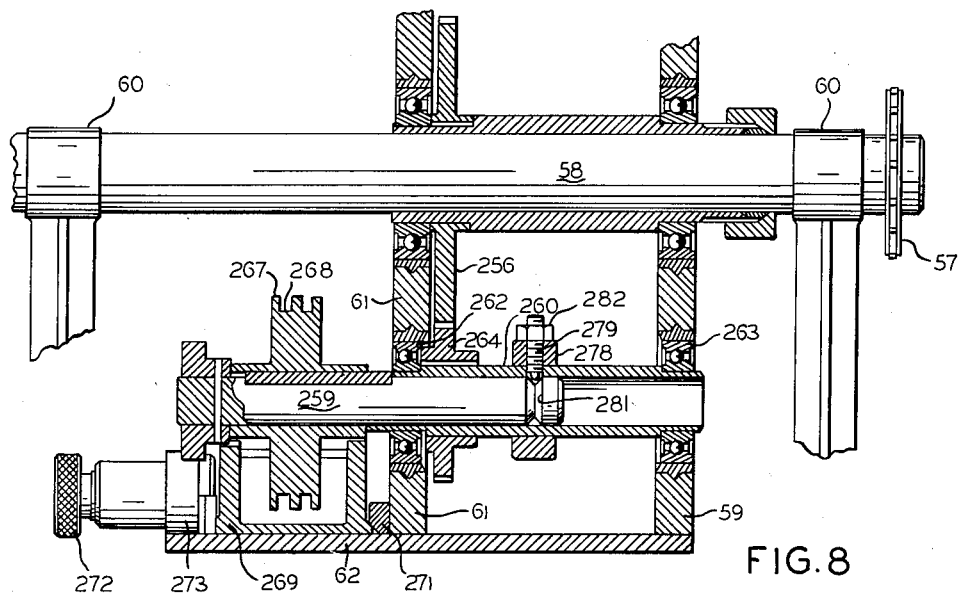
FIG. 8 is a sectional view taken along the line 8—8 of FIG. 3, looking in the direction of the arrows, showing details of a glue applying roller and the drive therefor.

Referring now particularly to FIGS. 4, 7 and 8 of the drawings, the addressing head 50 includes a pair of spaced frame members 59 and 61. Frame members 59 and 61 are secured in any convenient fashion to a base plate 62, see FIG. 8, and the upper edges of the frame members 59 and 61 are likewise secured in any convenient fashion to a top plate 63, see FIGS. 3 and 8, which forms a table over which a sheet of addresses LS, see also FIG. 29, is guided.

The addressing head 50 is adjusted in its position with respect to the table 31 with the shaft 58 as a pivoting point. Structure for adjusting the position consists of an arm 64 extending from the head 50 and longitudinally of the table 31, see FIGS. 1 and 2. The position of the arm 64 and the addressing head 50 is adjusted by means of a screw 66 engaging a bar 67 extending transversely of the bed 31, see FIG. 2, and having feet 68 secured to the bed 31 in any convenient fashion. The addressing head 50 may thus be raised and lowered with respect to the table 31 in accordance with the thickness of the mailing piece M moved by the conveyor 37.

The addressing head 50 comprises a fixed knife 71, see FIG. 4, which cooperates with a vertically movable knife 70 to sever the address sheet LS seen in FIG. 29, transversely thereof into an address strip containing a number of addresses corresponding to the number of columns arranged on the sheet LS. The so severed address strip is moved by a storage roller 72, see FIG. 3, where it is severed transversely thereof by a rotating knife 73 into individual addresses L. The address L is then transferred from the address strip storage roller 72 to an address applying roller 74 having a raised pad 75, the address L being held to the address strip storage roller 72 by means of suction, and also being held to the raised pad 75 of address applying roller 74 by suction means. The address L which has been transferred from the storage roller 72 moves past a glue applying roller 76, the directions of rotation of rollers 72, 74 and 76 being indicated by the arrows on the several parts. The raised pad 75 of the address applying roller 74 transfers the severed and pasted address to the magazine M, see again FIG. 3, suction being released against the raised pad 75 when it moves to the address applying position.

Structure is provided for intermittently feeding the address strip LS past the knife 71 and severing same by movement of the knife 70. Referring now to FIG. 7 of the drawings, the structure for advancing the address strip LS includes a power train comprising the shaft 58 which turns in bearings 77 each located in the frame members 59 and 61. The shaft 58 has a gear 78 fast thereto which meshes with a gear 79 supported on bearings 81 in turn supported upon a shaft 82 mounted in bearings 83 supported in frame member 59. Gear 79 has clutching dogs 84 formed in the hub thereof, the dogs 84 cooperating with mating dogs 86 of an axially shiftable clutching member 87. The clutching member 87 is keyed at 88 to the shaft 82 so that the rotation of the gear 79 is transmitted to a gear 89 secured to the shaft 82 by means of a nut 91.

The gear 89 meshes with a gear 92 secured upon an idler shaft 93 by means of a nut 95. Idler shaft 93 turns in a bearing 94 supported in the frame 59, and in a bearing 96 supported on a bracket 97 secured to the inner face of the frame 61. A gear 98 is fast on the shaft 93 and meshes with a gear 99 fast upon a shaft 101 supported in bearings 102 and 103 located respectively in the frame members 59 and 61. A mitre gear 104 is fast on shaft 101 and mates with mitre gear 106 fast on a shaft 107 turning in bearings 109 supported in spaced brackets 111 extending inwardly from the frame 59.

Structure is provided for stopping the gear train thus far described when the feed mechanism 35 seen in FIG. 1 fails to feed a magazine M at regularly spaced intervals, the switch 48 being thereby actuated to energize a solenoid 112, see FIG. 4. Solenoid 112 is secured to frame member 59 and has an armature 113 linked to a bell crank 114 supported on a bracket 116 mounted on the inside face of the frame 59. The bell crank 114 has an arm 117 connected at 115 to a rock arm 118 fast on a rock shaft 119, see also FIG. 3. Rock arm 118 is secured in a pair of supports 121 extending inward from the frame 59.

The rock arm 118 is fast with a pair of spaced arms 122 which are provided at each end thereof remote from rock arm 118 with a small roller 123 which fits into a complementary circular opening 124 on the clutch member 86.

It will be seen that when the solenoid 112 is actuated by the switch 48 that bell crank 114 will be rocked in a counter clockwise direction to shift the clutch member 86 in a direction away from the clutching dogs 84 and 86, to a position where a conical surface 126 on the end thereof will move into engagement with a mating conical surface 127 of a stationary clutch member 128 held to the frame 59 by screws 129. This braking engagement stops the operation of address applying head 50 until the feeder 35 once more feeds articles M at regularly spaced intervals.

Figure 6:
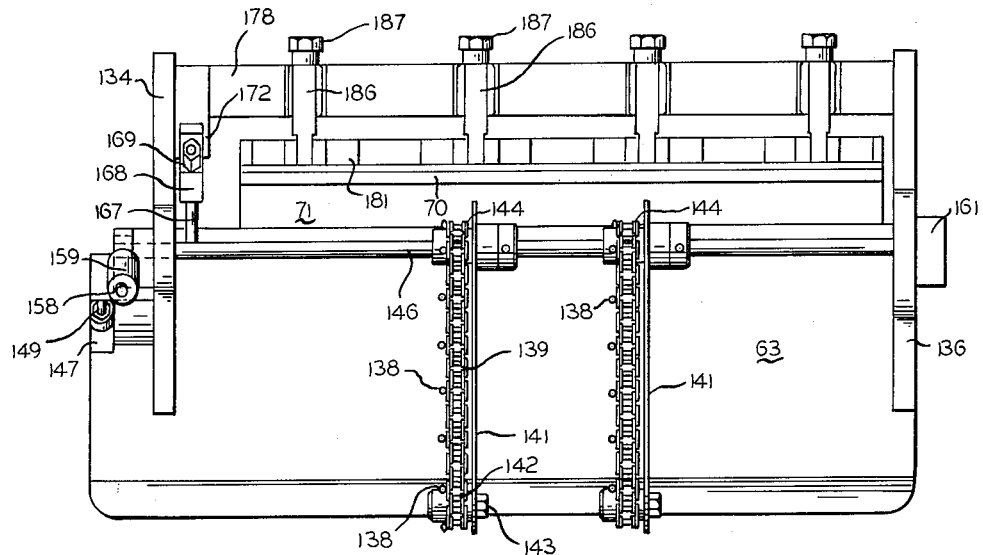
FIG. 6 is a detailed plan view looking in the direction of the arrows 6—6 of FIG. 4.
Figure 5:
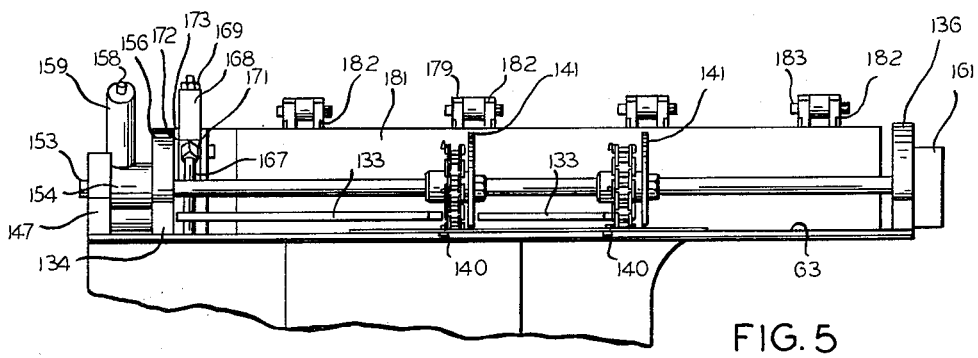
FIG. 5 is a view looking in the direction of the arrows 5—5 of FIG. 4.

The address sheet LS is moved over the top plate 63, see FIGS. 5 and 6, which extends for the length of the frame members 59 and 61. The address sheet LS is also guided beneath a plate 133 which extends from side guides 134 and 136 for address sheet LS. Address sheet LS has openings or apertures 137 therein, spaced according to the width of the strip to be severed therefrom, which are adapted to be engaged by lugs 138 of a conveyor chain 139 supported by a frame 141. An idler sprocket 142 is located at one end of the frame 141 and is secured in position by a bolt 143 passing through frame 141, see FIG. 6. Lugs 138 are adapted to move in slots 140 formed in the top plate 63, so that the lower run of the conveyor chains engage the opening 137 of the address sheet LS. The chain 139 is driven by a sprocket 144 fast upon a shaft 146, see also FIG. 4, which is advanced in a step-by-step fashion by structure as will now be described.

The shaft 107 has a crank 147 secured thereto by means of a set screw 148. A connecting rod 149 is connected to the crank 147 at a bearing 151 and a crank pin 152 threaded into the crank 147, see particularly FIG. 7. The other end of the connecting rod 149 is connected by a pin 153 extending from a crank arm 154 supported within a bearing 156 on one of the guides 134, see FIG. 4. The shaft 146 has a ratchet wheel 157 fast thereon, which co-operates with a spring biased dog 158 contained within a housing 159 integral with the crank arm 154. The movement of the connecting rod 149 is never over the center of the shaft 146, and its upward movement advances the dog 158 over the periphery of the ratchet wheel 157 while its downward movement gives clockwise rotation to the shaft 146, the dog 158 engaging one of the ratchet teeth of the ratchet wheel 157, as seen in FIG. 4.

In order to prevent counter clockwise movement of the shaft 146 during the upward movement of the connecting rod 149, the other end of the shaft 146 is provided with a ratchet 161 to prevent such movement. The details of such ratchet arrangement is well known in the art and need not be described in detail.

The address sheet LS which has been advanced by the lugs 138 on the chain 139 is moved into a position over the stationary knife 71, see FIG. 4, where it is severed by the downward movement of the moving knife 70.

Structure is provided for giving vertical motion to the knife 70 and comprises an eccentric 162, see FIG. 7, fast upon the shaft 107. Eccentric 162 is held fast to the shaft 107 by means of a pin 163, and an eccentric follower 164 turns with respect to the eccentric 162, needle bearings 166 being supported between the eccentric follower 164 and eccentric 163. A connecting rod 167 connects the eccentric follower 164 with a bearing supporting member 168 supported at the other end of the connecting rod 167 between adjusting nuts 169 and 171. A rock arm 172 has a bearing 173 at the end thereof to give free pivotal motion between the rock arm 172 and the member 168. The rock arm 172 is fast upon a shaft 174 which is supported at one end in an extension 176 of the guide 134 and at the other end in an extension 177 of the other guide 136.

The rock arm 172 is integral with a support for the knife 70 consisting of a hub 178 and arms 179 extending therefrom, see FIG. 3. The movable knife 70 is secured to a longitudinally extending knife support 181 which is suspended at points throughout its length by hangers 182 having pivotal connections at 183 to the arms 179. Each of the hangers 182 is connected by a clevis 184 having a threaded extension 186 therefrom, the position of the hangers 182 and the position of the knife 70 being determined by locking nuts 187 and 188 threaded to the extension 184.

The lugs 138 on the lower run of the intermittently operated chain 139 engage the openings 137 in address sheet LS and thus advance the address sheet LS in intermittent fashion past the fixed knife 71 where it is severed transversely therof by movable knife 70 into an address strip. The lugs 138 on the lower run of chain 139 move in the slot 140 in table 63 and readily engage openings 137 in address sheet LS. The so severed address strip is then transferred to the storage roller 72 to be carried at the periphery thereof past the rotating knife 73.

Structure is provided for holding the so severed address strip to the periphery of the storage roller 72 as will now be described. Referring now to FIGS. 3, 7, 9, 10 and 11 of the drawings, the storage roller 72 is held to the shaft 101 by means of a set screw 191 tapped into a radial bore 192 thereon. The storage roller 72 has laterally spaced suction openings 193 and 194 in the periphery thereof for engaging the leading end of the address strip. The storage roller 72 also has laterally spaced suction openings 196 and 197 for engaging the trailing edge of the label L. These suction openings 193 and 194 are respectively connected to suction passageways 198 and 199 which intersect with a suction passageway 201 also intersecting a face 202 of the storage roller 72.

The openings 196 and 197 for holding the trailing edges of the address strip L to the storage roller 72 respectively are connected to radial suction passageways 203 and 204 which intersect with a suction passageway 206 also intersecting the face 202 of the storage roller 72.

The aforesaid suction openings 193, 194, 196 and 197 in the periphery of the storage roller 72 cooperate with a suction valve 207, see FIGS. 27 and 28, which is mounted on the shaft 101 and is secured by means of screws to a suction valve manifold 208, see FIGS. 25 and 26. The suction manifold 208 and the suction valve plate 207 are held together by screws 209 tapped into the suction plate 207, and the suction plate 207 and the suction manifold 208 are held together as a unit in stationary position on the shaft 101 by means of a suction pipe 211 tapped into a boss 212 extending radially from the suction manifold 208. The suction pipe 211 together with the suction manifold 208 and the suction valve plate 207 is adjusted in position on the shaft 101 and with respect to the storage roller 72 by means of an adjusting bracket 213 and an adjusting screw 214 tapped into an arm 215 secured to the front frame 59, see FIG. 3. The adjustment of the position of valve 207 and manifold 208 determines the release of the address L from the storage roller 72. The suction manifold 208 and the suction valve 207 are held firmly against the storage roller 72, the latter bearing against an enlarged diameter portion 220 on the shaft 101, by means of a holding collar 225 held to the shaft 101 by means of a set screw 225a.

Structure is provided for severing the address strip which has been severed from the address sheet LS seen in FIG. 29 by the vertically movable knife 70 and the stationary knife 71, the strip being moved away from the position where it is severed by the knives 70 and 71 and being further severed into individual addresses while being held to the storage roller 72 by the aforesaid vacuum openings in the periphery thereof which are controlled in their operation by means of a vacuum valve 207. Release of the suction against the periphery of the storage roller 72 is accomplished by a venting passageway 210 located in the vacuum valve 207.

Referring back to FIGS. 25 and 26, the suction manifold 208 has an annular suction passageway 208a therein, which is in communication with the suction pipe 211. The vacuum in the suction passageway 208a manifests itself at annular suction passageways 217 and 218 formed in the suction valve plate 207, see FIGS. 27 and 28. The suction is provided at the suction openings 196, 197, 198 and 199 on the storage roller 72 by means of the annular suction passageways 217 and 218, suction at openings 193 and 194 being provided by passageway 217, and suction at openings 196 and 197 being provided by inner annular passageway 218. The rotation of the storage roller 72 past the aforesaid annular passageways 217 and 218, controls the suction at the address L, release of the suction being provided at the time of transfer to the address applying roller 74 by the vent 210 in the valve plate 207, which vents the openings 193 and 194, passageways 198 and 199, and passageway 201 to atmosphere when the storage roller 72 rotates to the transfer position with address applying roller 74. It may be noted that the suction still applied to the trailing end of the address L is but little, since the suction passageways 203, 204 and 206 will be out of register with the inner annular suction passageway 218. The address can then be easily stripped from storage roller 72 by address applying roller 74.

Structure is provided for severing the address strip held to the periphery of the storage roller 72, and to this end the storage roller 72 has radially extending slots 219 which intersect the periphery of the roller 72. Slots 219 are spaced equiangularly about storage roller 72, being separated a distance according to the length of an individual address. Slots 219 are adapted to receive a knife 221, see FIGS. 14, 15 and 16, each knife 221 having lugs 222 extending therefrom which flank the sides of the storage roller 72, the knife 221 being held in the slot 219 and to the sides of the storage roller 72 by means of screws 223.

The knife 221 held in the radial slot 219 of the storage roller 72 cooperates with a knife blade 224 of rotating knife 73, see FIGS. 17 and 18, held by means of screws 226 to a shaft 227 journaled in bearings 228 and 229 supported in a bearing block 231 adjustably mounted to the front frame 61, see also FIG. 7. The shaft 227 supporting the rotating knife blade 224 has a pinion 232 mounted thereon which meshes with a gear 233 fast on the shaft 101 driving the storage roller 72. The ratio for the pinion 232 and the gear 233 is such that the knife blade 224 makes one complete revolution for each length of an individual address.

As seen in FIGS. 12 and 13, the storage roller 72 may be configured according to whether the address sheet LS seen in FIG. 29 has three, four or five columns thereon. The storage roller 72 seen in FIG. 9 is designed for an address sheet having four or five columns of addresses thereon, as is also the roller 72 seen in FIG. 12. By suitably varying the gearing, as will be described, the same roller 72 can be used for either four or five column address sheets. Storage roller 72 seen in FIG. 13 is adapted for use with an address strip LS having three columns of addresses thereon.

The individual addresses which have been severed while in position on the storage roller 72 are each transferred to the address applying roller 74 having the raised pad 75 thereon. At the instant of transfer from storage roller 72 to raised pad 75 the suction is released first at the leading end of the individual address at suction openings 193 and 194 and thereafter at the trailing end at the suction openings 196 and 197 seen in FIGS. 9, 10 and 11. At the instant of transfer the raised pad 75 of the address applying roller 74 has suction manifested at the surface thereof to hold the label L thereto. Additionally, the individual address L is stripped from the storage roller 72 by means of a stripper finger 236, see FIG. 3, which is supported upon studs 237 tapped into the front face of the frame 61.

Referring now particularly to FIGS. 3, 4, 19, 20, 21 and 22 of the drawings, the address applying roller 74 has a central hub 235 keyed to a shaft 230 by means of a key 238. The address applying roller 74 has a radial suction passageway 239 which intersects with a passageway 241 generally parallel tot he axis of the shaft 101, the other end of the suction passageway 239 communicating with a suction cavity 242 within the raised pad 75, see FIG. 19. The raised pad 75, see FIGS. 2 and 22, has alternate lands and grooves 243 and 244, the lands 243 affording a surface for support of the address L.

Adjacent the leading end of the raised pad 75 the lands 243 are milled with slots 246 which connect with the suction cavity 242, so that the suction at the slots 246 holds the leading end of the address L to the raised pad 75. Radial suction passageways 247 also intersect the raised lands 243 and communicate with the suction passageway 242 additionally to hold the address L at the trailing end thereof to the raised pad 75. Cap screws 248 are tapped into the address applying roller 74 to hold the raised pad 75 thereto.

Structure is provided for controlling the suction applied to the openings 246 and 247 in the raised pad 75. As seen in FIGS. 23 to 26 inclusive, the suction is controlled by a suction valve member 251, secured to the manifold 208 seen in FIGS. 25 and 26. Manifold 208 is identical for use with the storage roller 72 and the address applying roller 74. The vacuum valve 251 and the manifold 208 are held together by the counter sunk screws 209 seen in FIGS. 25 and 26. Suction valve member 251 has an arcuate slot 252 communicating with the annular passageway 208a in the manifold member 208. The suction is supplied to the annular cavity by pipe 211, threaded to the boss 212 of the manifold 208, see FIG. 3, and the valve member 251 and the manifold 208 can be adjusted in position with respect to the address applying roller 74 by adjusting the position of the pipe 211 at bracket 213 and adjusting screw 214 previously described with reference to the storage roller 72. The adjustment of the position of manifold 208 and vacuum valve 251 determines the points at which suction is applied and released from the raised pad 75 to determine when the address L is picked up and released.

The manifold 208 and the valve 251 are held in position against the address applying roller 74 by means of a collar 253, similar to the collar 225 and held to the shaft 230 supporting the address applying roller 74, see FIG. 4.

The address applying roller 74 is arranged to rotate through one full revolution at each cycle, a cycle being determined by the spacing between adjacent magazines M seen in FIGS. 1 and 2. Power is provided for driving the address applying roller 74 by a gear fast on the drive shaft 58, see FIG. 7. Gear 256 meshes with an idler gear 257 turning in bearings 258 supported on an idler shaft 259 extending inward from the front frame 59, see again FIG. 7. Idler gear 257 meshes with a gear 261 fast on the shaft 230, see FIG. 4.

Referring back to FIGS. 19 to 21 and 22, the raised pad 75 has suction manifested against the openings 246 and 247 thereof when the raised pad 75 is in position as seen in FIG. 3 to receive an address L from the storage roller 72, the suction continuing to be manifested thereagainst until the address is moved by the roller 74 into a position against the moving magazine M, at which time the suction is released, the release of the suction being achieved by an exhaust passageway 255, see FIGS. 23 and 24 in the suction valve 252.

Structure is provided for applying a film of adhesive to the address L while it is held in position to the raised pad 75 of the address applying roller 74. Such structure includes the glue applying roller 76, see FIGS. 3 and 8, which is held by the key shown to a shaft 259 and a quill shaft 260, the two shafts turning in a bearing 262 supported in the front frame 61 and in a bearing 263 supported in the rear frame 59. The quill shaft 260 has a gear 264 keyed thereto which engages with the gear 256 forming part of the driving train for the address applying roller 74.

The glue applying roller 76 has alternate lands 267 and grooves 268, the lands 267 placing a line of glue upon the address L while it is being held to the raised pad 75.

The glue applying roller 76 turns within a glue reservoir 269 resting upon the base 62, reservoir 269 being held against a stop 271 on the base 62 by means of a holding screw 272 threaded into a bracket 273 supported on the base 62. The reservoir 269 also affords a support for a glue font 274.

A scraper blade 276 is held by screws 277 to the top of the reservoir 269 and adjusts the thickness of the film of adhesive carried by the raised lands 267 at the same time cleaning the grooves 268 of any adhesive.

The glue applying roller 76 is removable together with the reservoir 269 for cleaning purposes, the shaft 259 and the glue roller 76 being removable as a unit by releasing a coupling comprising a collar 278 having a radial pin 279 therein engaging a groove 281 in the shaft 259, the pin 279 being threaded into the collar 278 and locked in position by a nut 282.

It should be noted that apparatus according to the present invention makes it possible readily to employ an address sheet having two or more columns, although it is particularly economical where the addresses are arranged in three or more columns. The changes in the apparatus when a different width sheet is used is very simple.

This is accomplished by changing the ratio of the gears for driving the storage roller 72, the rotating knife 224, the address sheet LS and the moving knife 70. Assuming the address applying roller to make one revolution per cycle, the gearing will have the following ratios according to whether the sheet LS has three, four or five columns, as follows:

| Mating Gearing | Three Columns | Four Columns | Five Columns |
| --- | --- | --- | --- |
| 89, 92 | 3:1 | 2:1 | 2:1 |
| 104, 107 | 1:1 | 1:1 | 4:5 |
| 233, 231 | 3:1 | 4:1 | 4:1 |

Other changes in gearing will be possible according to the number of columns on the address strip LS, and according to the type of storage roller 72, those seen in FIGS. 9, 12 and 13 being examples.

While a preferred embodiment of the invention has been illustrated and described herein, the scope thereof is intended to be limited by only the claims here appended.

We claim:

1. In a machine for applying an individual address to a moving article, said machine being adapted to apply said address from a sheet thereof containing the addresses arranged in a plurality of columns with the addresses of each column arranged at regularly spaced intervals, means for feeding the sheet and means for severing the same between adjacent addresses of a column to provide an address strip, and including means for moving an individual address of said address strip into contact with said article: the improvements in said machine wherein a continuously rotating storage roller is adapted to receive the leading edge of said address strip, said storage roller being adapted to engage said address strip at successive portions therealong and maintain such successive portions in engagement therewith for subsequent severing of said address strip while thereon into individual addresses, means for successively severing the address strip into individual addresses, suction means for holding the so severed address strip to the periphery of said storage roller, valve means controlling the aforesaid suction means, an address holding roller for receiving an individual address from said storage roller, suction means for holding said individual address to said address holding roller, valve means for controlling said last named means, both of said valve means being operable to control the suction in said rollers for stripping an individual address from said storage roller and for transferring said address to said address holding roller, said last named means being operable to release each individual address from said address holding roller when said article is moving in contact with said address holding roller.

2. In a machine for applying an individual address to a moving article, said machine being adapted to apply said address from a sheet thereof containing the addresses arranged in a plurality of columns with the addresses of each column arranged at regularly spaced intervals, means for feeding the sheet and means for severing the same between adjacent addresses of a column to provide an address strip, and including means for moving an individual address of said address strip into contact with said article: the improvements in said machine wherein a continuously rotating storage roller is adapted to receive the leading edge of said address strip, said storage roller being adapted to engage said address strip at successive portions therealong and maintains such successive portions in engagement therewith for subsequent severing of said address strip while thereon into individual addresses, means for successively severing the address strip into individual addresses, suction means for holding the so severed address strip to the periphery of said storage roller, valve means controlling the aforesaid suction means, an address holding roller for receiving an individual address from said storage roller, suction means for holding said individual address to said address holding roller, valve means for controlling said last named means, both of said valve means being operable to control the suction at said rollers for stripping an individual address from said storage rollers and for transferring said address to said address holding roller.

3. In a machine for applying an individual address to a moving article, said machine being adapted to apply said address from a sheet thereof containing the addresses arranged in a plurality of columns with the addresses of each column arranged at regularly spaced intervals, means for feeding the sheet and means for severing the same between adjacent addresses of a column to provide an address strip, and including means for moving an individual address of said address strip into contact with said article: the improvements in said machine wherein a continuously rotating storage roller is adapted to receive the leading edge of said address strip, said storage roller being adapted to engage said address strip at successive portions therealong and maintain such successive portions in engagement therewith for subsequent severing of said address strip while thereon into individual addresses, means for successively severing the address strip into individual addresses, suction means for holding the so severed address strip to the periphery of said storage roller, valve means controlling the aforesaid suction means, an address holding roller for receiving an individual address from said storage roller, suction means for holding said individual address to said address holding roller, valve means for controlling said last named suction means, said last named valve means being operable to release said individual address from said address holding roller when said article is moving in contact with said address holding roller.

4. In a machine for applying an individual address to a moving article, said machine being adapted to apply said address from a sheet thereof containing the addresses arranged in a plurality of columns with the addresses of each column arranged at regularly spaced intervals, means for feeding the sheet and means for severing the same between adjacent addresses of a column to provide an address strip, and including means for moving an individual address of said address strip into contact with said article: the improvements in said machine wherein a continuously rotating storage roller is adapted to receive the leading edge of said address strip, said storage roller being adapted to engage said address strip at successive portions therealong and maintain such successive portions in engagement therewith for subsequent severing of said address strip while thereon into individual addresses, means for successively severing the address strip into individual addresses, suction means for holding the so severed address strip to the periphery of said storage roller, valve means controlling the aforesaid means, an address holding roller for receiving an individual address from said storage roller, suction means for holding said individual address to said address holding roller, valve means for controlling said last named means, both of said valve means being operable to control the suction at said rollers for stripping an individual address from said storage roller and for transferring said address to said address holding roller, said last named valve means being operable to release said individual address from said address holding roller when said article ins moving in contact with said address holding roller.

5. In a machine for applying an individual address to a moving article, said machine being adapted to apply said address from a sheet thereof containing the addresses arranged in a plurality of columns with the addresses of each column arranged at regularly spaced intervals, means for feeding the sheet and means for severing the same between adjacent addresses of a column to provide an address strip, and including means for moving an individual address of said address strip into contact with said article: the improvements in said machine wherein a continuously rotating storage roller is adapted to receive the leading edge of said address strip, said storage roller being adapted to engage said address strip at successive portions therealong and maintain such successive portions in engagement therewith for subsequent severing of said address strip while thereon into individual addresses, knife means for successively severing the so severed address strip into individual labels, means for holding the so severed address strip to the periphery of said storage roller, an address holding roller for receiving an individual address from said storage roller, means for holding said individual address to said address holding roller, and means for controlling said last named means and being operable to release said individual address from said address holding rollers when said article is moving in contact with said address holding roller.

6. In a machine for applying an individual address to a moving article, said machine being adapted to apply said address from a sheet thereof containing the addresses arranged in a plurality of columns with the addresses of each column arranged at regularly spaced intervals, means for feeding the sheet and means for severing the same between adjacent addresses of a column to provide an address strip, and including means for moving an individual address of said address strip into contact with said article: the improvements in said machine wherein a continuously rotating storage roller is adapted to receive the leading edge of said address strip, said storage roller being adapted to engage said address strip at successive portions therealong and maintain such successive portions in engagement therewith for subsequent severing of said address strip while thereon into individual addresses, means for successively severing the address strip into individual addresses, means for holding the so severed address strip to the periphery of said storage roller, an address holding roller for receiving an individual address from said storage roller, means for holding said individual address to said address holding roller, and means for controlling said last named means.

References Cited in the file of this patent
UNITED STATES PATENTS

| | | |
|---|---|---|
| 946,327 | Bowlus | Jan. 11, 1910 |
| 1,302,735 | Tzibides et al. | May 6, 1919 |
| 2,543,220 | Ardell | Feb. 27, 1951 |
| 2,606,681 | Ridenour | Aug. 12, 1952 |